United States Patent [19]
Berner et al.

[11] Patent Number: 5,977,967
[45] Date of Patent: Nov. 2, 1999

[54] OBJECT-ORIENTED BUSINESS OBJECT INTERFACE FRAMEWORK AND METHOD

[75] Inventors: Andrew J. Berner, Irving; Nathan S. Fish, Plano; Sarah V. Denney, Allen, all of Tex.

[73] Assignee: Electronic Data Systems Corporation, Plano, Tex.

[21] Appl. No.: 08/642,002

[22] Filed: May 1, 1996

[51] Int. Cl.⁶ .................................................. G06F 3/00
[52] U.S. Cl. .................................... 345/335; 395/683
[58] Field of Search .................................... 345/335, 339, 345/346, 967, 965, 683, 684, 701, 705, 710; 395/680, 683, 200, 200.31

[56] References Cited

U.S. PATENT DOCUMENTS

| | | | |
|---|---|---|---|
| 5,377,350 | 12/1994 | Skinner | 395/683 |
| 5,408,659 | 4/1995 | Cavandish et al. | 395/701 |
| 5,511,197 | 4/1996 | Hill et al. | 395/683 |
| 5,627,979 | 5/1997 | Chang et al. | 345/335 |
| 5,642,511 | 6/1997 | Chow et al. | 395/701 |
| 5,649,131 | 7/1997 | Ackerman et al. | 345/335 |

*Primary Examiner*—A. Katbab
*Attorney, Agent, or Firm*—Robert W. Holland; L. Joy Griebenow

[57] ABSTRACT

Interface object classes providing a template class (402) for list boxes (500) and a template class (410) for combo boxes (506) which encapsulates a linkage mechanism to associate the items listed in the list box and combo box to objects (614) in a business object (612). When an item is selected in a list box or combo box, the object associated with the selected item is referenced automatically without explicit coding.

21 Claims, 4 Drawing Sheets

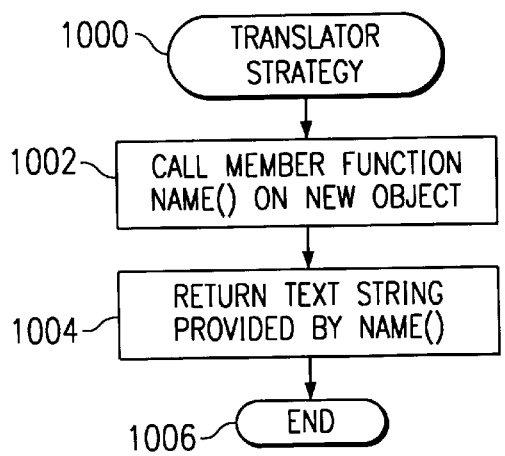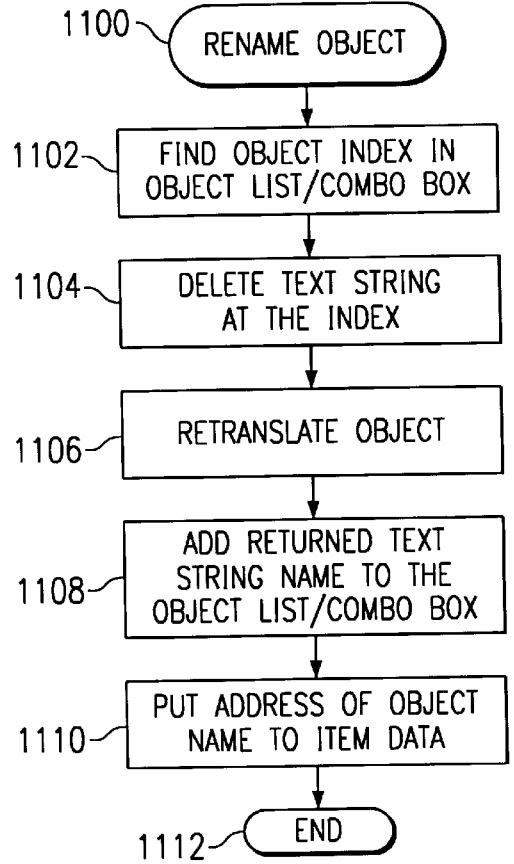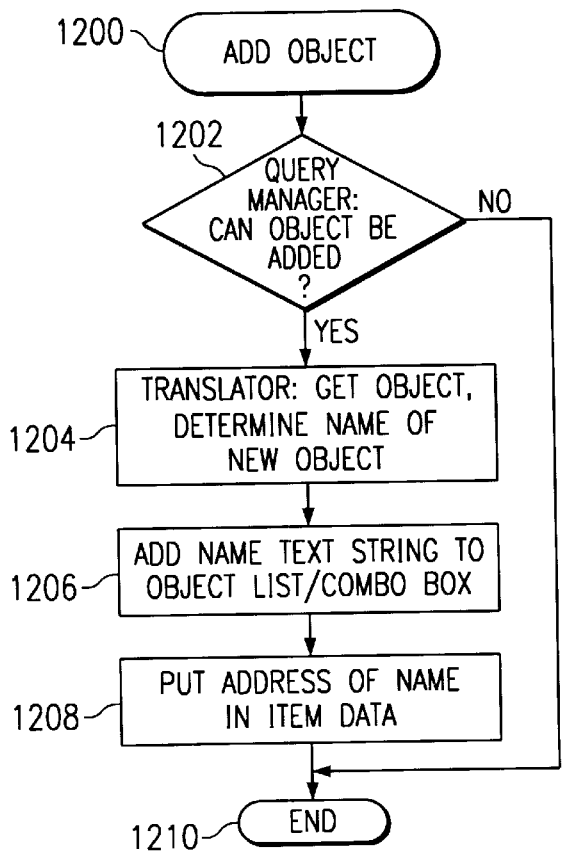

OBJECT-ORIENTED BUSINESS OBJECT INTERFACE FRAMEWORK AND METHOD

TECHNICAL FIELD OF THE INVENTION

This invention is related in general to the field of computer programming. More particularly, the invention is related to an object-oriented business object interface framework and method therefor.

BACKGROUND OF THE INVENTION

In object-oriented programming, real-world objects are modeled by software objects that have encapsulated therein special procedures and data elements. In object-oriented programming jargon, procedures are referred to as methods, and data elements are referred to as data members. To avoid having to redefine the same methods and data members for each and every occurrence of an object, object-oriented programming provides the concept of classes. An inheritance structure of one or more levels of increasingly more specialized classes is created to provide templates that define the methods and variables to be included in the objects of each class. Therefore, an object belonging to a class, which is an instance of that class, contains the special behavior defined by the class. In this manner, each object is an instance of a defined class or template and the need to redefine the methods and data members for each occurrence of the object is eliminated.

Microsoft Windows® applications displaying information in the form of windows and dialog boxes are becoming the norm for graphical user interfaces. Object-oriented programming techniques and languages are typically used to create these Windows® applications. The windows can be easily manipulated by the user in size, location, and arrangement. Several special types of windows are provided for displaying as well as receiving information. For example, a list box is a window that provides a list of text strings and a combo box is a window that provides a list of text strings as well as editing functions. A user may select one or more items in the list in both types of boxes and further edit the list in the combo box.

Tools are currently available to allow programmers to generate code for graphical interface objects such as menus, dialogs and windows. One tool is the such Object/Designer® by ImageSoft Incorporated, Port Washington, N.Y. However, the interface objects generated by these tools are not linked to any data or methods in the application. For example, if the graphical user interface generator tool is used to generate a list box containing a list of camera presets for a particular video camera, the selection of a camera preset would not automatically result in changing the camera pan, tilt, focus and zoom to achieve the selected preset. The programmer has to write explicit code to link the text items in the list box to business objects, in this case the camera, in order for the selection to have any real meaning. When there are many business objects requiring linkage to interface objects, the programmer has to write the code for each and every one of the links. This becomes time consuming and error-prone to write and debug, since the explicit code has to be modified everywhere when the application is expanded or when the objects are reused in another context.

SUMMARY OF THE INVENTION

Accordingly, there is a need for providing a framework that encapsulates the linkage mechanism between a business object and an interface object.

In accordance with the present invention, a framework is provided which eliminates or substantially reduces the disadvantages associated with prior implementations.

In one aspect of the invention, a method for associating a business object with an interface object includes the steps of inheriting from a list box class and providing an object list box class having encapsulated therein a link to a business object associated therewith, and inheriting from a combo box class and providing an object combo box class having encapsulated therein a link to a business object associated therewith.

In another aspect of the invention, an object-oriented business object interface framework includes at least one business class in a business application, and at least one object in the business class. Further, at least one interface object class encapsulating a linkage to the associated business object provides one or more instances of interface objects for displaying on an interface.

BRIEF DESCRIPTION OF THE DRAWINGS

For a better understanding of the present invention, reference may be made to the accompanying drawings, in which:

FIG. 10 is a simplified flowchart of an exemplary translator strategy;

FIG. 11 is a simplified flowchart of an exemplary rename business object process; and FIG. 12 is a simplified flowchart of an exemplary add business object process.

DETAILED DESCRIPTION OF THE INVENTION

Figure 1:
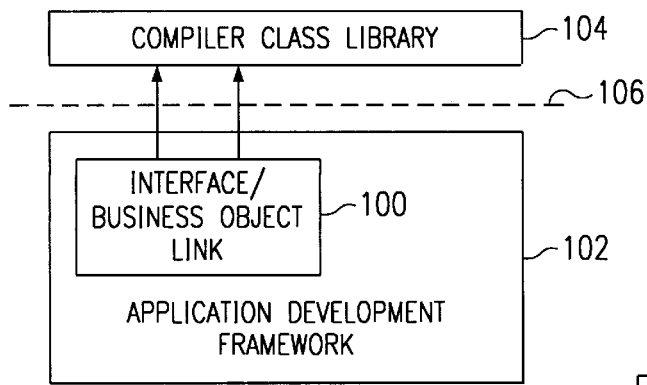
FIG. 1 is a simplified block diagram of an application development framework.

The preferred embodiment(s) of the present invention is (are) illustrated in FIGS. 1–12, like reference numerals being used to refer to like and corresponding parts of the various drawings.

Object-oriented analysis and programming are becoming the dominant techniques for the development of information systems. However, using a native object-oriented programming language such as C++ can be very time consuming. Application frameworks give programmers the tools that can be used and reused on a variety of projects to make C++ programming more productive and efficient. Referring to FIG. 1, A business object interface framework 100 is proposed as a component of an application development framework 102. Application development framework and business object interface framework 100 may inherit behaviors from classes within a compiler class library, such as Borland's Object Windows Library® for C++ and Microsoft's MFC® for Visual C++®. A portability layer 106 may be provided between compiler class library 104 and business object interface framework 100 to allow the system to be maintainable and portable to new environments as requirements change and new development tools evolve.

Figure 2:
FIG. 2 is a simplified block diagram of an exemplary business object and interface objects according to the teachings of the present invention.

Referring to FIG. 2, a business application 200 may include a number of business objects 202–205, where each may model a real world system or device. A number of interfaces 210–214 may control and monitor business objects 202–205 by sending and receiving data to and from them. In general, interfaces 210–214 and business objects 202–205 act in a client-server mode.

Figure 3:
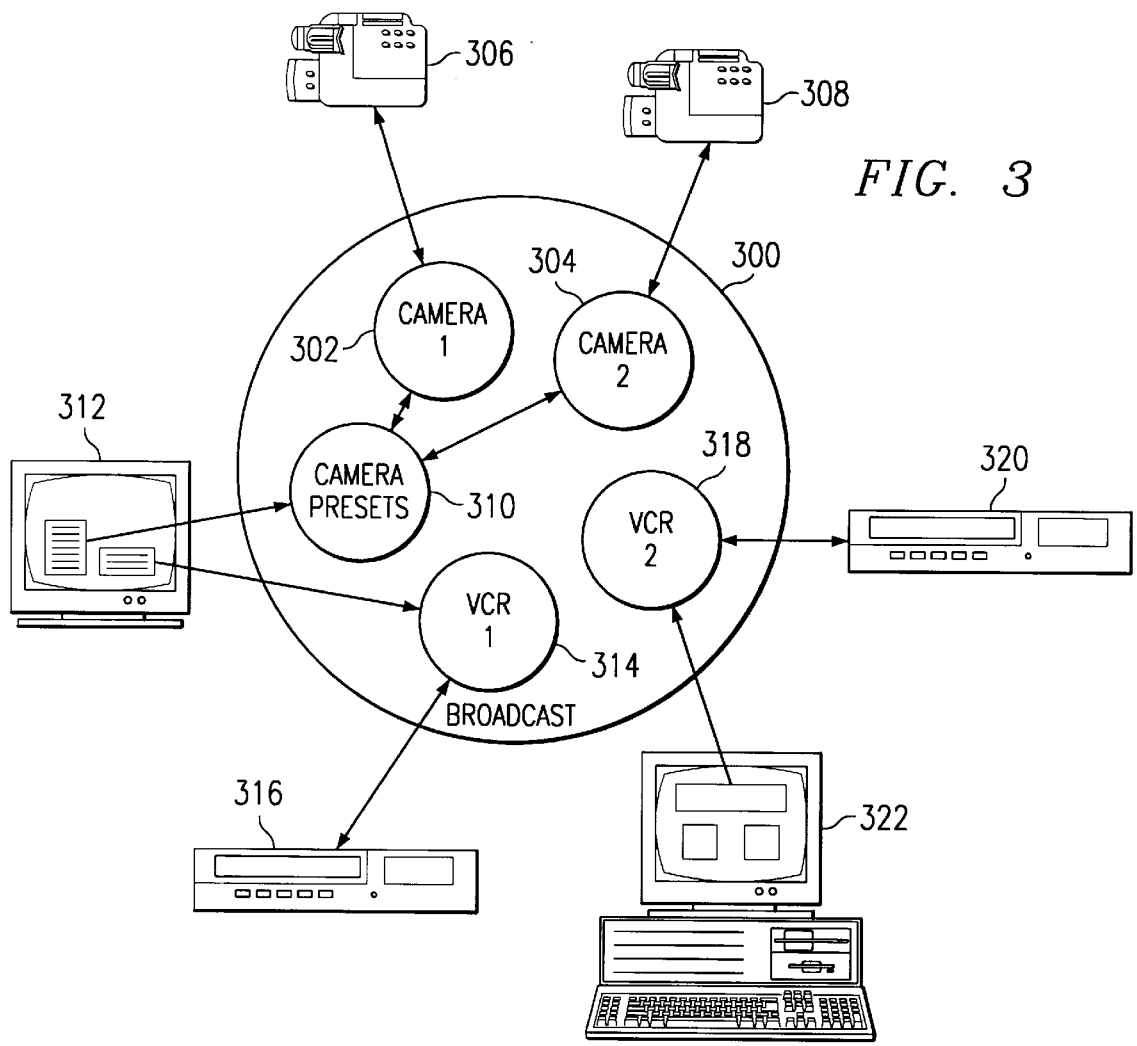
FIG. 3 is a simplified block diagram of an exemplary multi-tiered software architecture according to the teachings of the present invention.

FIG. 3 is an expansion of the multi-tiered architecture shown in FIG. 2 as applied to an exemplary scenario. A business application may be a planned broadcast 300 of a video production. Broadcast 300 includes a number of business objects: camera 1 302, camera 2 304, camera presets 310, VCR 1 314, and VCR 2 318. Camera 1 and camera 2 control video cameras 306 and 308, respectively. VCR 1 and VCR 2 control VCRs 316 and 320, respectively. Further, two displays 312 and 322 provide user interfaces for receiving user input and displaying control parameters for cameras 1 and 2 and VCR 1 and 2. The multiple tiers in the software architecture improves the portability and maintainability of the system. For example, change video camera 306 to a different brand or model would not affect camera presets 310 or the graphical display, since they are isolated by camera 1 object 302.

Figure 4:
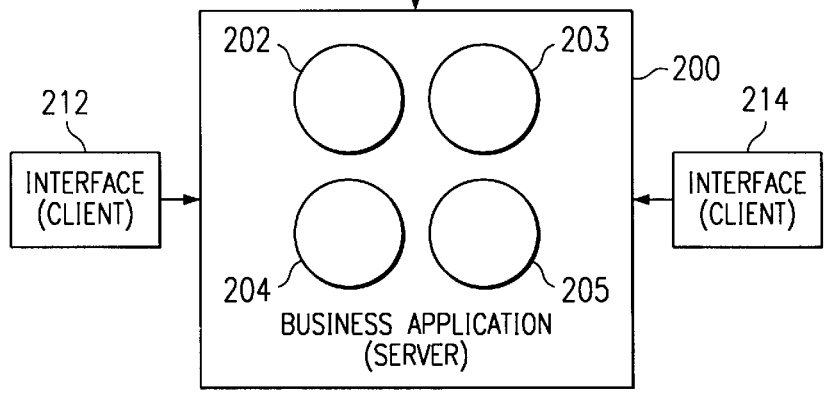
FIG. 4 is a simplified block diagram of exemplary object list box and object combo box according to the teachings of the present invention.

Referring to FIG. 4, a business object interface framework 400 is provided. An object list box class 402 inherits from a list box class 404 and further encapsulates methods and variables 406 for linking the list items in list box 404 to one or more business objects 409. Object list box 404 further encapsulates a manager 407 and a translator 408 for performing special functions. Similarly, an object combo box class 410 inherits from a combo box class 412 and further encapsulate methods 414, variables, a translator 416, and a manager 418 for linking object list box 410 to one or more business objects 409. Each object list box and object combo box may point to different and/or common business objects 409. List box and combo box classes 404 and 412 may be part of compiler class library 104 and portability layer 106, shown in FIG. 1, from which object list box 402 and object combo box 410 inherit some of their behaviors.

Figure 5A:
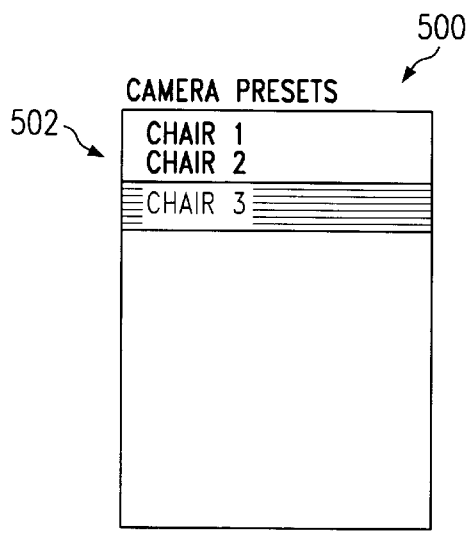
FIG. 5A is a graphical and exemplary representation of a list box.

FIG. 5A shows an exemplary list box 500 which displays a list of text strings 502 representing camera presets: "CHAIR 1", "CHAIR 2", and "CHAIR 3". A user may use a data entry device, such as a mouse or a keyboard, to highlight and select a text string in the list.

Figure 5B:
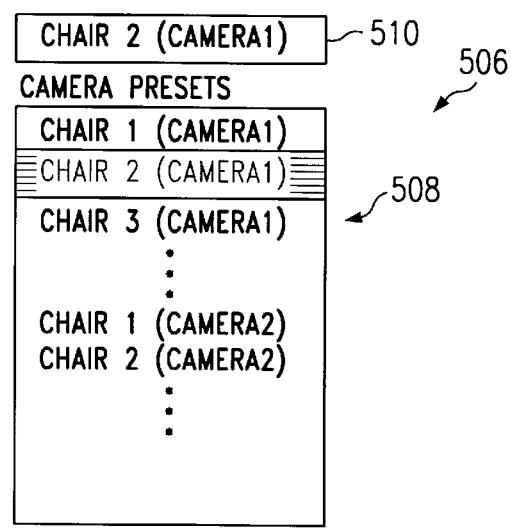
FIG. 5B is a graphical and exemplary representation of a combo box.

FIG. 5B shows an exemplary combo box 506 which also displays a list of text strings 508 representing camera presets of particular video cameras. In addition, an edit box 510 is provided to allow the user to enter new entries or change an existing entry.

When list box 500 and combo box 506 are generated using object list box and object combo box classes as templates, the resulting object list box and object combo box are associated with objects of a particular business class, such as camera presets 310 and VCR 1 of broadcast business class 300 (FIG. 3).

Figure 6:
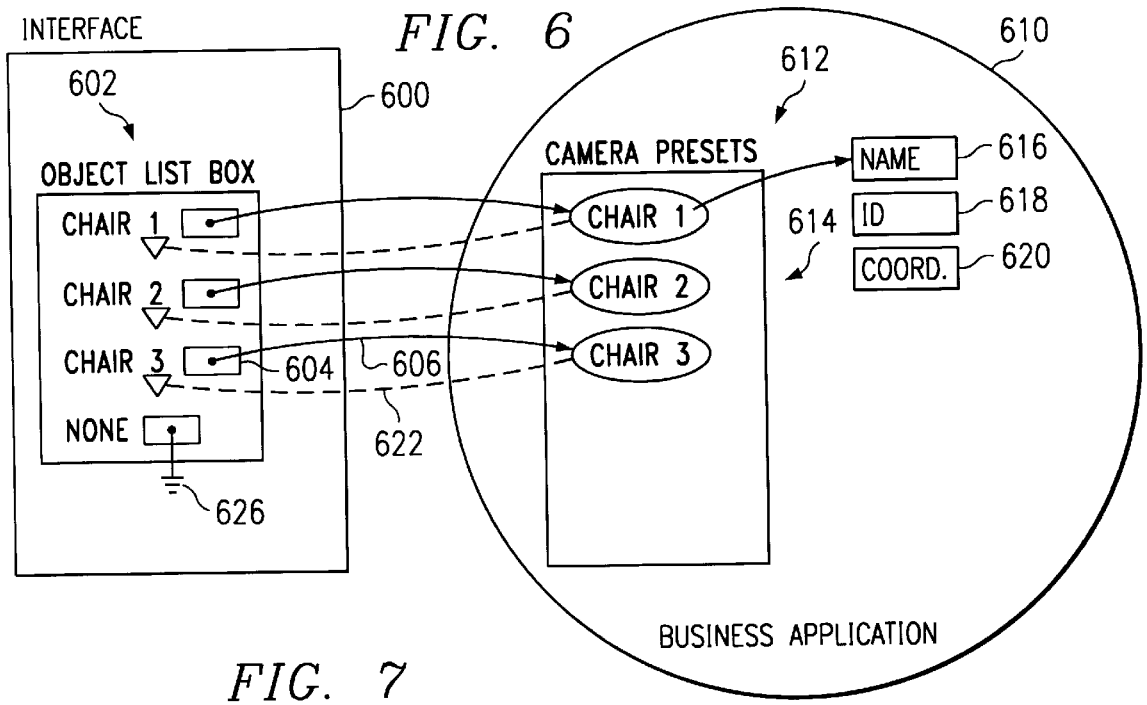
FIG. 6 is a simplified block diagram of the linkage mechanism between a business object and an interface object according to the teachings of the present invention.

FIG. 6 provides more details of how the linkage between object list and combo boxes and business objects is achieved by using a studio production example. At the screen display or user interface 600, an object list box 602 is displayed showing a list of four text strings: "CHAIR 1", "CHAIR 2", "CHAIR 3", and "NONE". Each text string in the list has an item data field 604 associated therewith. This item data field 604 is not shown on the screen. In object list box 602, item data 604 is used to store an address location of the name of a corresponding object in camera presets 612 of a business application 610. In this manner, item data 604 is used as a pointer to the first data location of the business object it is associated with. The text string "NONE" in the object list box is a stand-alone string that does not represent any object. When a stand-alone text string is selected, the contents of its item data field, a NULL pointer 626, is returned.

Each object or camera preset has encapsulated data, such as a name 616, a camera identifier 618, and coordinates 620. In the present example, "CHAIR 1" is the name of the first camera preset object, camera identifier (ID)618 identifies the video camera the preset is associated with, and coordinates 620 includes the pan, tilt, focus, and zoom positions of the camera preset to properly frame the person sitting in the studio chair in the studio designated as "CHAIR 1". Constructed in this manner, when a user selects a text string in object list box 602, it is directly associated by the encapsulated linkage mechanism to the business object without additional explicit coding. The pointer in item data 604 is thus encapsulated in the object list box and object combo box classes.

Figure 7:
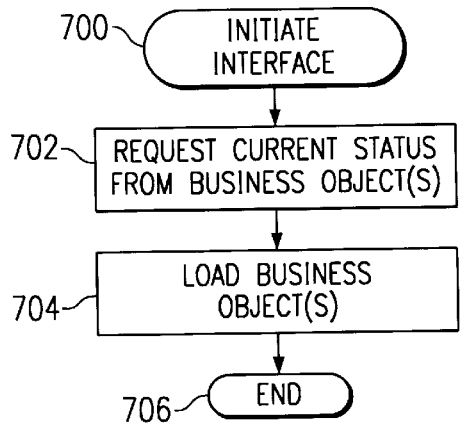
FIG. 7 is a simplified flowchart of an exemplary initiate interface process.

FIG. 7 is a simplified flowchart of an exemplary interface initiation process 700. When a new interface is started, it requests the one or more business objects it is associated with to supply it with their current status or list of objects, as shown in block 702. It then loads the business objects onto the display screen one by one and terminates, as shown in blocks 704 and 706. For example, if it is intended that the interface has a list box displaying a list of camera presets, a combo box listing the available VCRs, and another list box listing the cameras available, the load process would preferably load the camera presets, the available VCRs, and the available cameras one by one.

Figure 8:
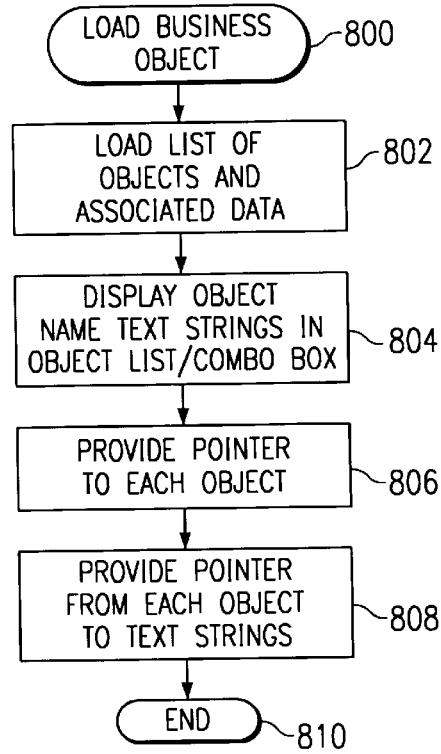
FIG. 8 is a simplified flowchart of an exemplary load business object process.

An exemplary load business object process 800 is shown in FIG. 8. The list of objects and their associated data are loaded into the proper object list box or object combo box at the interface and displayed on the screen, as shown in blocks 802 and 804. In the example shown in FIG. 6, only the data name is selected to be displayed in the object list box. Translator 408 (FIG. 4) of object list box 602 performs the function of determining which of the associated data or what combination thereof is to be displayed. The translation function of the translator is described in more detail below.

Subsequently, the first address location of the business object is stored in the item data field of each item in the list to provide a pointer thereto, as shown in block 806. The process then terminates in block 810.

Figure 9:
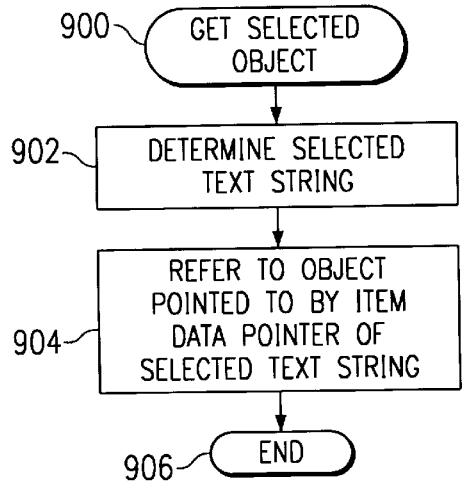
FIG. 9 is a simplified flowchart of an exemplary get selected business object process.

A method 900 to get selected object is shown in FIG. 9 for associating a selected text string in the object list box or object combo box to its object. In block 902, a determination is made as to which text string in the list is selected by the user. The address stored in item data is then used to determine the object associated with the selected text string. The process ends in block 906.

As referred to above, a translator is used to determined what text string is to be displayed in the object list box or object combo box. A default or standard translator strategy 1000 merely provides the name of the object, as shown in FIG. 10. In block 1002, the translator calls a member function Name( ) on the new object to obtain its name. It is assumed that the new object is a member of the business class that includes this member function, which returns a text string that is the standard name of the object. The text string representing the name of the object, which is then returned by the translator strategy, as shown in block 1004. The process ends in block 1006.

A standard translator strategy that may be encapsulated in a business class that has a member function Name( ) may have the following code:

```
string
ObjTranslator<TapeSegment>: :DisplayName(const
TapeSegment & theObject)
{
    return theObject.Name( );
}
```

The example above may be used by an application which manages the use of program segments on a video tape. The class TapeSegment has the member function Name( ) that returns the title of the segment, so that the standard translator returns tape segments names for display in the object list box:

```
Introduction
Opening Credit
. . .
Closing Credit
```

A customized translator strategy may be used to append the name of the tape to the name of the tape segment if more than one video tapes are involved in the program. The programmer may implement the following exemplary code to do so:

```
class CustomTapeSegmentTranslator: public
ObjTranslator<TapeSegment>
. . .
. . .
string
CustomTapeSegmentTranslator: :DisplayName (const
TapeSegment & theObject)
{
return theObject.Name( ) + "(" +
theObject.VCRTape( ).Name( ) + ")";
}
```

The above custom translator returns a text string in the form of:

```
segment_name(tape_name)
```

For example, a list compiled by using the custom translator may be:

```
Introduction(Intro Tape)
Opening Credit(Intro Tape)
Writing Object-Oriented Software(C++ Tape)
Compiling Object-Oriented Software (C++ Tape)
Closing Credit(Intro Tape)
```

FIGURES 5A and 5B also provide examples of lists prepared by a standard translator and custom translator, respectively. The translator strategy may be changed at will and at any time.

FIG. 11 shows an exemplary process for renaming an existing business object 1100. Renaming an object may be necessary because an event caused a change in the object and therefore its name is modified to reflect this change. Alternatively the translator strategy may be changed, which returns a new text string for display in the object list and combo boxes. In block 1102, the index of the object in question is determined. The object index describes the display location of the text string of that object. For example, object list box 602 shown in FIG. 6 displays a list where "CHAIR 1" has an index of 0, "CHAIR 2" has an index of 1, "CHAIR 3" has an index of 2. Therefore, one way of determining the index of the object is to compare the address of the object with the item data content of each text string. A match of the two addresses indicates which text string is associated with the object. The text string at the index is then deleted, as shown in block 1104. The translator, whether default or custom, is then called to determine what new text string should be used to represent that object in the object list box, as shown in block 1106. The text string returned by the translator is then added to the displayed list, as shown in block 1108. If the list box is sorted in some manner, the newly added text string and the corresponding item data are moved to the appropriate position or index in the list. The address of the object is then entered into the item data of the new text string, as shown in block 1110. The process ends in block 1112.

An exemplary add object strategy 1200 is provided in FIG. 12. In block 1202, the manager in object list box or object combo box is queried to determine whether the proposed object can be added. The object may not be added for a number of reasons, such as that the object is already on the list, depending on the manager's strategy. The manager returns a reply to indicate whether the object can be added. If not, the process ends. If yes, the translator is called on to determined the name or text string to represent the new object on the screen, as shown in block 1204. The text string is then added to the object list box or object combo box on the interface, as shown in block 1206. The address of the object is then stored at the item data location of the text string item in the list. The process then ends in block 1210.

One manager strategy is to always reply yes to the question posed in block 1202. In this strategy, after the object list box or object combo box is loaded from a list of business objects maintained by the manager, other objects may be added and deleted without updating the original business object list. In another manager strategy, after loading the business objects, the object list box continues to be associated with the list of business objects. When an object is added to the object list box, it is also added to the list. When an object is deleted from the object list box, it is also deleted from the list. The manager strategy may be changed at will and at any time.

It may be seen from the foregoing that the object list box and object combo box classes provide templates that readily associate a list box and a combo box with objects of a particular business class without explicit coding being written for every item in the list box and combo boxes. Further, the framework provides for automatic translation of selected text of the object to be displayed in the list box and combo box, and management strategies for maintaining the lists therein.

Although the present invention and its advantages have been described in detail, it should be understood that various changes, substitutions and alterations can be made therein without departing from the spirit and scope of the invention as defined by the appended claims.

What is claimed is:

1. A method for associating business objects with an interface object, comprising the step of inheriting from a box class and providing an object box class having encapsulated therein a link to a business object associated therewith.

2. The method, as set forth in claim 1, wherein said inheriting step comprises the step of inheriting from a list box class and providing an object list box class having encapsulated therein a link to a business object associated therewith.

3. The method, as set forth in claim 1, wherein said is inheriting step comprises the step of inheriting from a combo box class and providing an object combo box class having encapsulated therein a link to a business object associated therewith.

4. The method, as set forth in claim 1, further comprising the steps of:

requesting a current list of objects; and loading said list of objects in said interface object.

5. The method, as set forth in claim 4, wherein said loading step comprises the steps of:

loading said list of objects and associated data;

determining a name for each of said objects from said associated data;

displaying said name of said list of objects in an instance of said object box class; and providing a first pointer from each name to its associated object.

6. The method, as set forth in claim 5, wherein said first pointer providing step includes the step of storing an address of said object in an item data field of said name.

7. The method, as set forth in claim 5, wherein said first pointer providing step includes the step of storing a NULL value in an item data field of said name.

8. The method, as set forth in claim 5, wherein the name determining step comprises the steps of obtaining a text string representative of each object.

9. The method, as set forth in claim 8, wherein the text string obtaining step comprises the step of providing a standard name translator for obtaining said text string.

10. The method, as set forth in claim 9, wherein the text string obtaining step further comprises the step of providing a custom name translator for obtaining said text string.

11. The method, as set forth in claim 5, further comprising the steps of:

obtaining a list index of a name displayed in an object box corresponding to an object;

deleting said displayed name from said object box;

obtaining a new name representative of said object;

adding said new name to said object box; and updating said first pointer.

12. The method, as set forth in claim 5, further comprising the steps of:

querying a manager whether a new object can be added;

in response to an affirmative response from said manager, obtaining a name representative of said new object;

adding said new name to said object box; and providing said first pointer.

13. An object-oriented business object interface framework, comprising:

at least one business object in a business application;

at least one object in said business object; and at least one interface object class encapsulating a linkage to said associated business object for providing one or more instances of interface objects for display on an interface.

14. The framework, as set forth in claim 13, wherein said interface object class comprises an object list box inheriting from a list box class for providing instances of object list boxes.

15. The framework, as set forth in claim 13, wherein said interface object class comprises an object combo box inheriting from a combo box class for providing instances of object combo boxes.

16. The framework, as set forth in claim 13, wherein said interface object comprises:

an object list box displaying a list of text strings; and each said text strings having a pointer to its associated object in an associated business object.

17. The framework, as set forth in claim 13, wherein said interface object comprises:

an object combo box displaying a list of text strings; and each said text string having a pointer to its associated object in an associated business object.

18. The framework, as set forth in claim 13, further comprising a translator for determining a text string representing its associated object for display on said interface.

19. The framework, as set forth in claim 13, further comprising a standard translator for determining a standard text string representing an object for display on said interface.

20. The framework, as set forth in claim 13, further comprising a custom translator for formulating a text string representing an object for display on said interface.

21. The framework, as set forth in claim 13, further comprising a manager for authorizing the addition and deletion of an object to said interface object.

* * * * *